May 23, 1972  D. KELBEL  3,664,754
HAND DRILL ALIGNMENT DEVICES AND METHODS OF
MAKING AND USING THE SAME
Filed Nov. 3, 1969

Inventor
DONALD KELBEL
By Roger M. Hibbits
Attorney

{ # United States Patent Office

3,664,754
Patented May 23, 1972

3,664,754
HAND DRILL ALIGNMENT DEVICES AND METHODS OF MAKING AND USING THE SAME
Donald Kelbel, 5469 Ruskin, St. Louis, Mo. 63115
Filed Nov. 3, 1969, Ser. No. 873,374
Int. Cl. B23b *49/00;* G01c *9/28*
U.S. Cl. 408—16
3 Claims

ABSTRACT OF THE DISCLOSURE

The present invention relates to bubble type alignment devices for use in upon and with hand drills comprising bubble type level chambers appropriately shaped and operably mounted to a conventional hand drill allowing a first such level which is aligned parallel to the drill bit and a second such level which is aligned perpendicular to the first.

BACKGROUND OF THE INVENTION

In the use of conventional hand drills a common requirement calls for holes which are to be drilled which must be essentially horizontal or vertical. Such a use frequently occurs during the installation of structural members in a building or home.

Devices currently available are generally expensive, complicated or are extremely bulky and interfere with the work being performed. Additional accessories such as straps, clamps and the like are generally required.

SUMMARY OF THE INVENTION

It is therefore an object of the present invention to provide a hand drill alignment device which is simple to manufacture, easy to install and readily replaced.

Another object of the present invention is to provide such a device which is adapted to the contour of such a hand drill and thus minimizes the interference of such device with the work being performed and minimizes the danger of blows to the alignment device and thus damage thereto.

A further object of the present invention is to provide such a device which will allow alignment of the hand drill both vertically and horizontally without adjustment or change in the device.

These together with other objects and advantages, which will become subsequently apparent, reside in the details and construction and operation as more fully hereinafter described and claimed, reference being had to the accompanying drawings forming a part hereof, wherein like numerals refer to like parts throughout, and in which:

DETAILED DESCRIPTION OF THE INVENTION

Figure 1:
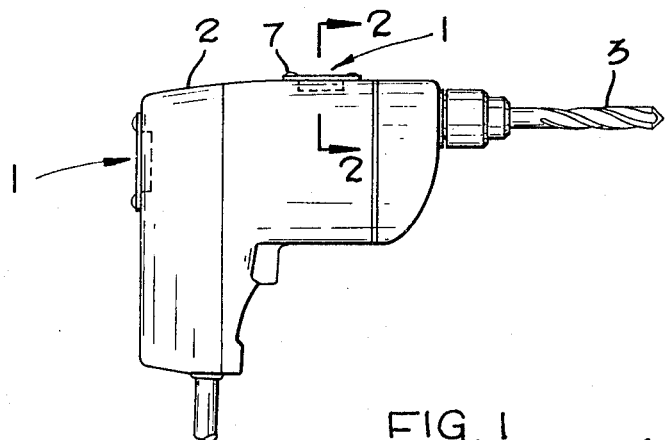
FIG. 1 is an elevation view of a hand drill embodying an alignment device constructed in accordance with and embodying the present invention.

Referring now in more detail to the accompanying drawings in which FIG. 1 illustrates in perspective, alignment device, 1, constructed in accordance with and embodying the present invention installed on a conventional hand drill, 2.

In FIG. 1, alignment device, 1, is installed on hand drill, 2, parallel to the longitudinal axis of drill bit, 3. Another alignment device, 1, is installed perpendicular thereto in the handle of hand drill, 2.

Figure 2:
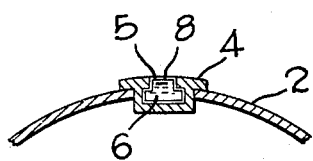
FIG. 2 is a partial sectional view of the alignment device shown in FIG. 1.

Alignment device, 1, is shown in greater detail in FIG. 2, and is seen to comprise bracket, 4, which contains fluid chamber, 5, which contains fluid, 6, and is essentially constructed of materials used customarily in carpenters bubble levels.

Alignment device, 1, is secured to the peripheral surface of hand drill, 2, by means of fasteners, 7, which may be rivets, metal screws, or the like. As seen in FIG. 2, alignment device, 1, conforms to the outer surface of drill, 2, by appropriate shaping of bracket, 4, and chamber, 5. Wall, 8, of chamber, 5, is transparent thus and allowing a user to view the liquid bubble associated with liquid, 6, and thereby determine a level condition.

Figure 3:
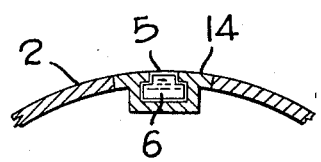
FIG. 3 is a partial sectional view of anoher embodiment of the alignment device shown in FIG. 1.

FIG. 3 illustrates another embodiment of alignment device, 1, wherein frame, 4, has been replaced by frame, 14, thus minimizing exposure of alignment device, 1, above the peripheral surface of hand drill, 2. That portion of alignment device, 1, on frame, 4, which serves as a flange for fasteners, 7, is repeated on frame, 14.

Figure 4:
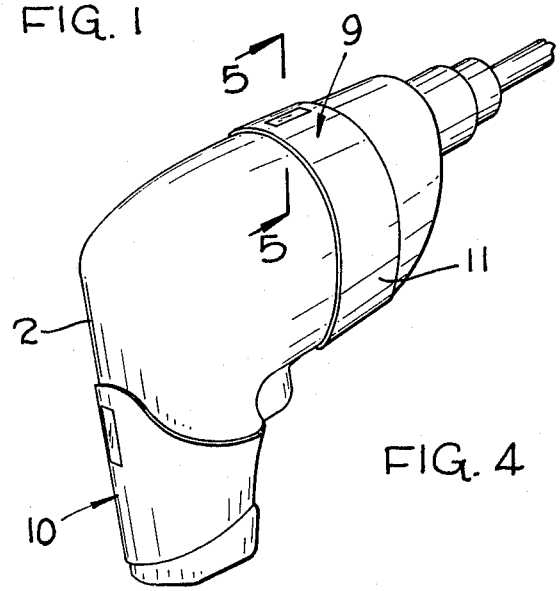
FIG. 4 is a perspective view of a hand drill with another alignment device constructed in accordance with and embodying the present invention mounted thereon.
Figure 5:
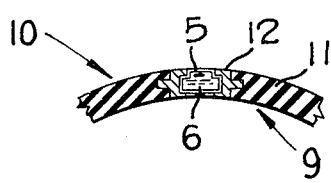
FIG. 5 is a partial sectional view of the alignment device shown in FIG. 4.
Figure 6:
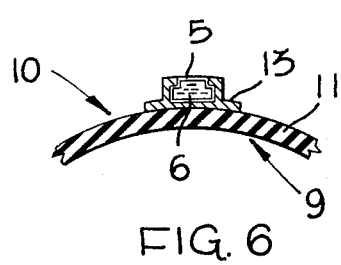
FIG. 6 is a partial sectional view of another embodiment of the alignment device shown in FIG. 4.

FIG. 4 illustrates another embodiment of the present invention, showing alignment device, 9, and alignment device, 10, secured to the shank portion of hand drill, 2, and the handle portion of hand drill, 2, respectively. Alignment devices, 9, and, 10, and another embodiment thereof are shown in greater detail in FIGS. 5 and 6. In FIGS. 4, and, 5, device, 9, is seen to comprise elastic strap, 11, frame, 12, and chamber, 5, containing liquid, 6. Another embodiment of alignment device, 9, is shown in FIG. 6 wherein alignment device, 9, comprises strap, 11, with frame, 13, secured to the outer surface thereof by adhesive or other suitable fastener, and containing chamber, 5, which contains liquid, 6. Alignment device, 9, therefore essentially comprises elastic strap, 11, in combination with a bubble chamber, which may be installed integral of said strap or on the peripheral surface thereof.

Alignment device, 10, is essentially the same as alignment device, 9, except that it is formed to fit about the handle of hand drill, 2, and adapted to meet the contour of said handle and the trigger switch contained therein as shown in FIG. 4.

It is also clear from the drawings that alignment device, 9, or, 10, may be constructed by securing chamber, 5, directly to strap, 11.

It should be understood that changes and modifications in the form, construction, arrangement, and combination of the elements of the hand drill alignment devices and methods of making and using the same may be made and substituted for those herein shown and described without departing from the nature and principle of my invention.

Having thus described my invention, what I claim and desire to secure by U.S. Letters Patent is:

1. In a conventional drill provided with a handle portion and shank portion, said shank portion adapted to secure a conventional drill bit, an alignment device comprising, a plurality of mounting frame means, said mounting frame means removably mountable to the surface of said hand drill, a plurality of bubble chamber means operably mounted to said mounting frame means, said bubble chamber means disposed within the normal contour of the surface of said hand drill, and disposed in said handle portion and said shank portion of said hand drill.

2. An alignment device for use with conventional hand drills which are provided with a handle portion and shank portion comprising,
   a plurality of elastic strap means, said elastic strap means adapted to fit about the shank portion and handle portion of said hand drill,
   said elastic strap means provided with bubble chamber means therein such that the exterior surfaces of said bubble chamber means coincides with the exterior surfaces of elastic strap means.

3. In a conventional drill provided with a handle portion and shank portion adapted to secure a conventional drill bit, an alignment device comprising,
   mounting means operably mounted to the surface of the handle of said hand drill, and
   bubble chamber means operably mounted to said mounting means, said bubble chamber means disposed within the normal contour of the exterior surface of said hand drill handle.

References Cited

UNITED STATES PATENTS

| | | | |
|---|---|---|---|
| 2,670,638 | 3/1954 | Roy | 77—55 G |
| 2,767,483 | 10/1956 | Sauer | 33—207 |

FRANCIS S. HUSAR, Primary Examiner

U.S. Cl. X.R.

33—207; 408—234, 241